Dec. 28, 1965  O. T. SARBER  3,226,127
CHUCK
Filed Oct. 7, 1963  3 Sheets-Sheet 1

INVENTOR.
OLIVER T. SARBER
BY *Hobbs & Easton*
ATTORNEYS

Dec. 28, 1965    O. T. SARBER    3,226,127
CHUCK

Filed Oct. 7, 1963    3 Sheets-Sheet 2

INVENTOR.
OLIVER T. SARBER
BY Hobbs & Easton
ATTORNEYS

Dec. 28, 1965     O. T. SARBER     3,226,127
CHUCK
Filed Oct. 7, 1963     3 Sheets-Sheet 3
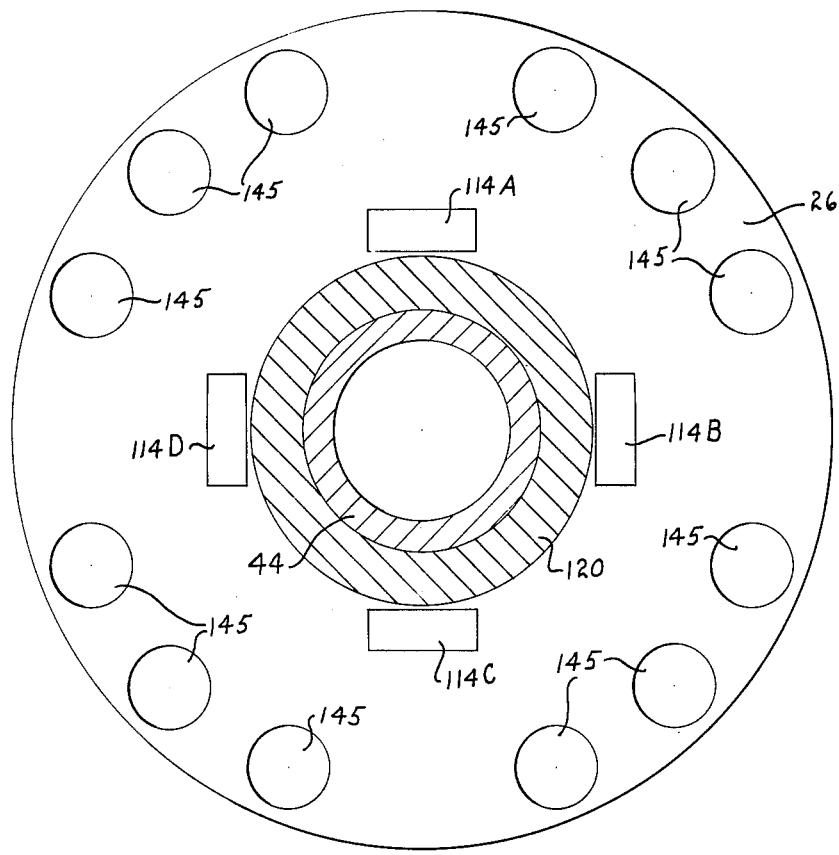
FIG. 3
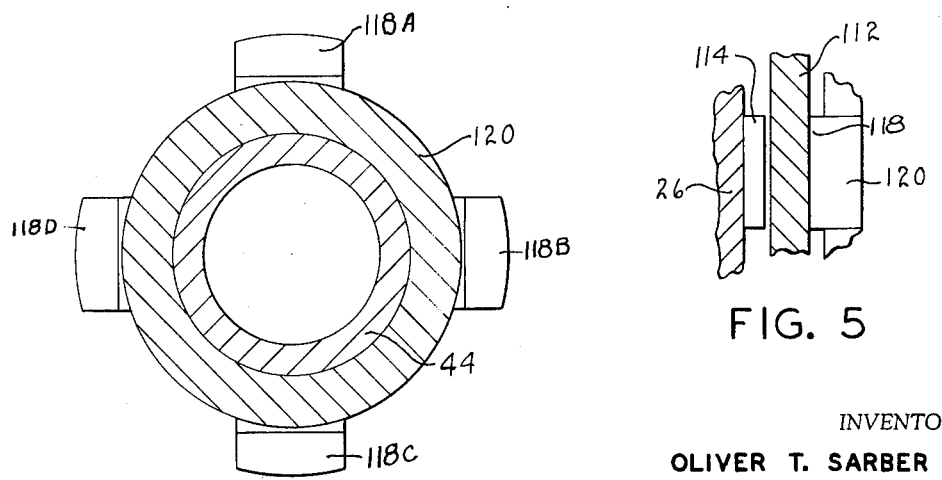
FIG. 4
FIG. 5
INVENTOR.
OLIVER T. SARBER
BY *Hobbs & Easton*
ATTORNEYS … # 3,226,127
CHUCK
Oliver T. Sarber, 1211 Strong Ave., Elkhart, Ind.
Filed Oct. 7, 1963, Ser. No. 314,271
6 Claims. (Cl. 279—4)

The present invention relates to a chuck and more particularly to a universal diaphragm chuck for use on lathes and grinder, screw and boring machine.

Diaphragm chucks are designed and constructed to give and maintain extreme accuracy in retaining a work piece in proper position for machining and repeating the work piece engaging and disengaging operation an unlimited number of times without varying the setting on the chuck or otherwise becoming improperly adjusted with respect to the cutting tool. The universal diaphragm chuck will normally initially provide the extreme accuracy required; however, with repeated chucking operations, wear occurs in some of the moving parts which result in misalignment of the work piece or insecure engagement of the work piece by the jaws of the chuck. Since the diaphragm chuck is designed for extreme accuracy, slight wear between several of the moving parts of the chuck often renders the chuck unsatisfactory for further precise and accurate work. While minor adjustments can be made in the chuck to compensate for the wear, the inaccuracies resulting from the wear usually can not be completely eliminated by these adjustments. Further, since the wear betwen the parts is often small for the amount of unacceptable misalignment or maladjustment of the work piece, difficulty is encountered in repairing and reconditioning the moving parts of the chuck to give the required satisfactory performance. It is therefore one of the principal objects of the present invention to provide a diaphragm chuck which is so constructed and arranged that the few moving parts embodied therein are substantially free of wear or other impairment, interfering with the proper alignment of the work piece and proper alignment of and engagement of the work piece by the jaws of the chuck, and which can be used repeatedly without any significant change in the moving parts or in the adjustments thereof.

Another object of the present invention is to provide a universal diaphragm chuck which, while similar to the standard diaphragm in construction and operation, is provided with moving operating features of a design and construction especially resistant to wear from repeated chucking and dechucking operations, and which can be embodied in the standard or conventional diaphragm chuck without making any substantial changes or modifications in the basic construction thereof.

Still another object of the present invention is to provide a diaphragm chuck which can be accurately mounted in an adapter for a lathe, grinder, screw or boring machine and precisely controlled throughout repeated operations to engage and disengage work pieces, and which will perform satisfactorily under adverse operating conditions without the operation becoming impaired by grease, cuttings or other foreign material.

A further object is to provide a relatively simple, easily operated chuck of the aforesaid type which is relatively simple to fabricate and assemble and which can be used satisfactorily with a variety of different machine tools.

Additional objects and advantages of the present invention will become apparent from the folowing description and accompanying drawings, wherein:

FIGURE 3 is a fragmentary vertical cross sectional view of one of the operating elements, taken on line 3—3 of FIGURE 2;

FIGURE 4 is a fragmentary vertical cross sectional view of one of the operating elements, taken on line 4—4 of FIGURE 2;

FIGURE 5 is a fragmentary vertical cross sectional view of one of the operating elements, taken on line 5—5 of FIGURE 2.

Figure 6:
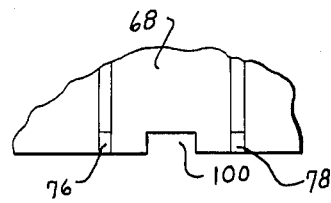
FIGURE 6 is a fragmentary top plan view of the present diaphragm chuck.
Figure 1:
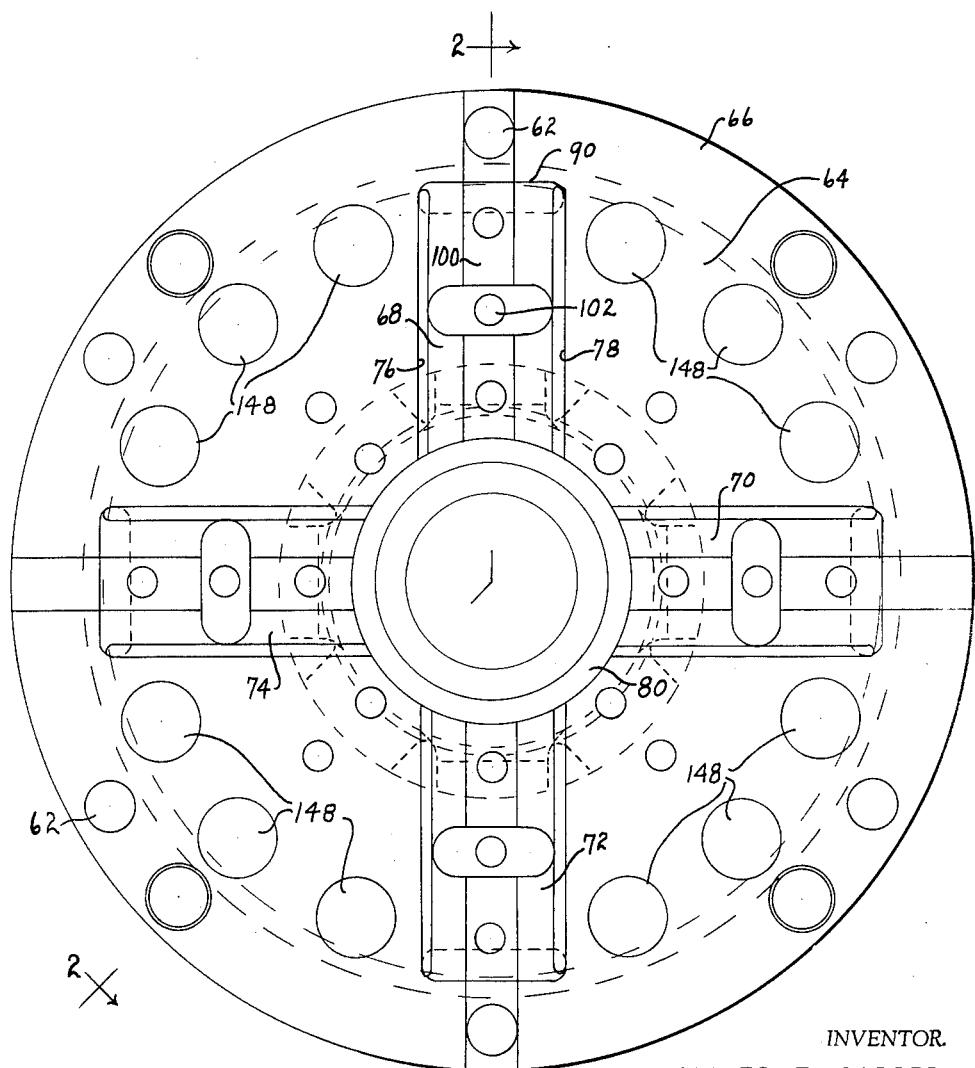
FIGURE 1 is a front elevational view of a diaphragm chuck embodying the present invention, the chuck being shown without the standard or conventional jaws normally mounted on the face of the chuck for engaging and holding various work pieces.
Figure 2:
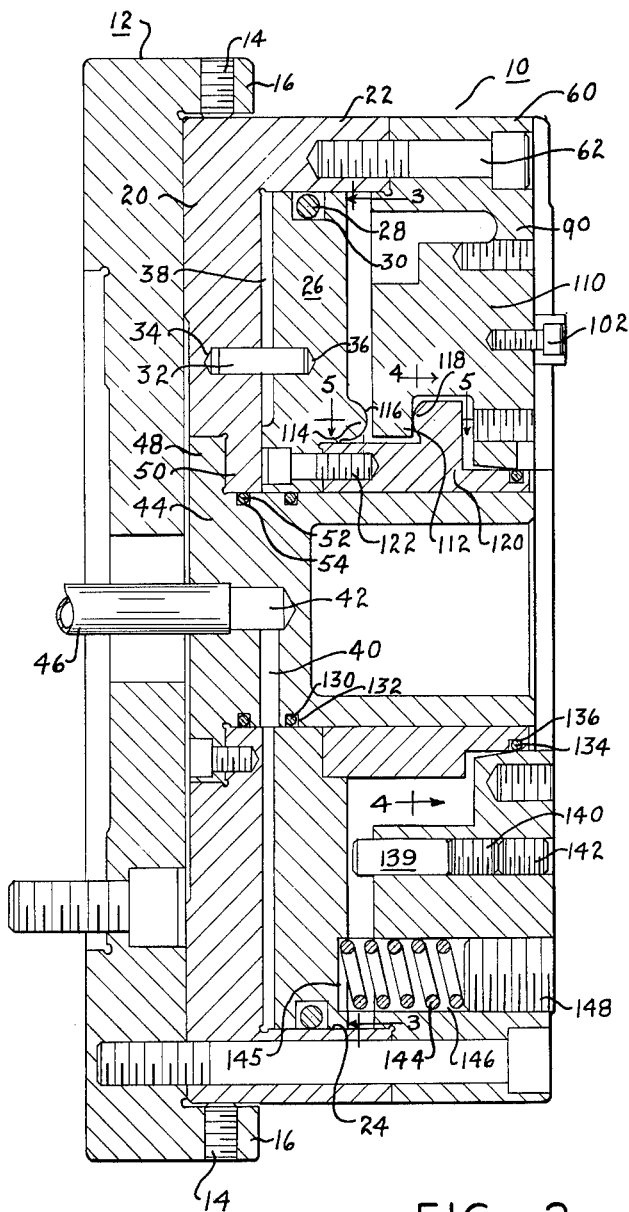
FIGURE 2 is a vertical cross sectional view of the present diaphragm chuck shown in FIGURE 1, the section being taken on line 2—2 of FIGURE 1, and the chuck being shown mounted in proper operating position on a face plate adapter for a lathe, grinder, screw or boring machine.

Referring more specifically to the drawings, numeral 10 designates the present diaphragm chuck mounted on a face plate adapter 12 of a lathe or other machine tool and secured thereto by a plurality of set screws 14 disposed in flange 16 of the adapter and engaging the periphery of the chuck. While the present chuck is shown mounted on the face plate adapter of a lathe, it may be used satisfactorily on grinding, screw and boring machines, and may be mounted on any suitable adapter or constructed as an integral part of the machine. The face plate 12 is rotatably mounted on the lathe head stock from which the face plate adapter 12, chuck 10, and the work piece mounted in the chuck are driven in unison, while the cutting tool (not shown) performs the cutting or machining operation on the work piece.

The present chuck consists of a disc-shaped body 20 with an axially extending annular flange 22 joined integrally to the external margin of the body and projecting forwardly from the base of body 20, flange 22 forming a cylinder having a smooth cylindrically-shaped inner wall 24. The cylinder formed by flange 22 contains a disc-shaped piston 26 engaging the inner wall 24 and being sealed thereto by an O-ring gasket 28 seated in annular groove 30 in the periphery of piston 26, the piston being adapted to move toward and away from the base of body 20 and being held in fixed angular position by a plurality of pins 32 equally spaced around the piston and seated in recesses 34 and 36 of the base and piston, respectively. The space 38 between the base of body 20 and the inner face of piston 26 is connected to a source of compressed air by a radially extending passage 40 and axially extending passage 42 in hub 44 and tube 46 extending through the head stock. The air pressure for operating the piston is regulated by suitable controls (not shown) mounted on or near the lathe. Body 20 is mounted on hub 44 and is held against axial movement by external flange 48 on hub 44 and internal flange 50 on body 20, a fluid-tight seal being formed between the hub and body by an O-ring gasket 52 seated in annular groove 54.

A disc or cylindrically-shaped diaphragm or jaw assembly 60 is mounted on the forward edge of flange 22 and secured thereto by a plurality of bolts 62 extending inwardly through jaw assembly 60 into flanges 22, the bolts being recessed in the diaphragm assembly with the heads thereof completely within the assembly. The assembly consists of a disc-shaped front face member 64 integrally attached to the marginal portion 66 through which bolts 62 extend into flange 22, and the front face member is provided with four diaphragm jaw elements 68, 70, 72 and 74, each being separated on its two radial sides from face member 64 by grooves 76 and 78 extending radially outwardly from opening 80 of hub 44 to marginal portion 66.

Each diaphragm jaw element is integrally secured to marginal portion 66 by a connecting neck 90 which forms a hinge permitting the respective inner ends of the jaw elements to move inwardly and outwardly pivoting at neck 90 and carrying with them the jaws (not shown) secured to the jaw elements for engagement and disengagement of the work piece, the jaws having an inner work piece engaging part and an external work piece engaging part. The jaws (not shown) seat in radial slots 100 of each jaw element 68, 70, 72 and 74 and are adapted to be adjusted radially outwardly and inwardly and held in fixed adjusted position by screws 102.

An inwardly extending member 110 of jaw elements 68, 70, 72 and 74, is joined integrally to the inner side of each jaw element and is provided with an inwardly extending flange 112 which forms an abutment for the operation of the jaw elements by piston 26. The jaw elements are moved forwardly by engagement of the inner sides of flanges 112 by the respective bars 114 (A, B, C and D) which are formed integrally with the piston 26 on the outer surface thereof. The bars extend substantially the full width of the respective jaw element and have transversely curved surfaces 116 extending the full length of the bars. These bars forming the contact element for the piston provide a relatively large bearing contact surface between the adjacent face of flange 112 and the bar, and the curvature thereof provides a constant point of contact, unchanged by the movement of the piston. Thus, as the bar is urged into contact with the adjacent face of flange 112 to force the jaw element 68, for example, outwardly, a contact is made between the bar throughout its entire length and the corresponding surface on the flange, the curved and relatively long surface of the bar permitting the jaw element to be moved outwardly and inwardly repeatedly without causing any significant wear between the bar and the adjacent surface of flange 112. A similar bar 118 is provided on an annular extension 120 of piston 126, the annular extension being slidably mounted on the external surface of hub 44 and rigidly secured to the piston by a plurality of spaced bolts 122. Bars 118 (A, B, C and D) are identical in construction and design to corresponding bars 114 (A, B, C and D) and contact a corresponding surface on the opposite side of flange 112, thereby creating a constant and an effective low wearing bearing surface between extension 120 and the adjacent surface of flange 112.

The piston is sealed at its inner edge around hub 44 by a gasket 130 seated in annular groove 132, and the extension is sealed at the inner edge of the jaw assembly by an O-ring 134 seated in an annular groove 136 in the external surface of the extension. The maximum adjustment capable of being made by the piston is controlled by micro-adjustment pin 139 and screws 140 and 142 seated in the portions of the front face member 64 between the respective jaw elements 68, 70, 72 and 74. When the jaw assembly is inserted in place, flanges 112 are slipped inwardly between bars 118 (A, B, C and D) and then rotated to a position in alignment with respective bars 114 and 118.

It is thus seen that as the piston 26 is moved outwardly, bars 114 contact the adjacent surface of flanges 112 to move the respective jaw elements outwardly and, as the piston is moved inwardly, bars 118 contact the adjacent surface of flanges 112 to move the respective jaw element inwardly. The piston is urged outwardly by compressed air admitted into space 38 through passages 40 and 42 and moved inwardly by coil springs 144 seated in recesses 145 in piston 26 and in recess 146 of the jaw assembly and being adjustable by screw 148.

In the operation of the present diaphragm chuck, after it has been mounted on the face plate adapter 12, the jaws (not shown) are adjusted inwardly or outwardly in the respective slots 100 to the approximate position required to center the work piece. If the jaw assembly is being used as external jaws, the work piece is inserted between the inner edges of the jaws while compressed air is admitted into space 38, thereby holding the jaws outwardly to expand the distance between the inner edges of the jaws. The air pressure in space 38 is then released, and the plurality of springs 144 urge the piston and extension 120 inwardly, causing bars 118 to engage the adjacent surface of flanges 112, thereby moving the jaws inwardly, and along with the tension of resilient hinge 90, firmly clamping the work piece in place between the inner edges of the jaws.

In the event the chuck is used with internal jaws, the work piece is assembled on the external jaw portions and air pressure is admitted through passages 40 and 42 into space 38, thereby causing piston 26 to move forwardly. Thereupon, bars 114 of the respective jaw elements 68, 70, 72 and 74 engage the adjacent surface of flanges 112, urging the jaws outwardly and increasing the distance between the external jaw parts to grip the internal wall of the work piece to hold the piece firmly in place while the machining operation is being performed.

It is seen that, in the present construction, bars 114 and 118 engage the flange and move the jaw elements 68, 70, 72 and 74 outwardly and inwardly and operate effectively as bearing surfaces without producing any indentation or scoring of the surfaces on flange 112 contacted by the bars. Further, since the bars themselves are provided with a relatively large contact point along the entire ridge of the bar, the bars themselves wear relatively little from repeated operations of the chuck and provide a constant contact point throughout the movement of the piston. Thus, extremely delicate settings can be maintained and repeated without alterations from wear within the chuck.

While only one embodiment of the present diaphragm chuck has been described in detail herein, various changes and modifications may be made without departing from the scope of the invention.

I claim:

1. A diaphragm chuck for lathe, grinder, screw and boring machines, comprising a cylindrical-shaped body with an end member and cylindrical side walls forming a fluid cylinder, a hub for said body connected to said end member, a piston in said cylinder forming a pressure chamber between the piston and said end member, said hub having a passage therein connecting said chamber with a source of air under pressure, a disc-shaped jaw assembly mounted on said body and secured to the edge of said side walls, said jaw assembly having a solid ring-shaped outer portion and four equally spaced jaw elements attached integrally to and extending radially inwardly from said outer portion to a point adjacent said hub, each of said jaw elements having an inwardly extending portion with a circumferentially extending flange on the inner side thereof, a bar-like member on said piston with an arcuate surface extending substantially parallel with said flange on said piston for engaging the adjacent surface of said flange, an extension on said piston disposed adjacent to said hub extending to the opposite side of said flange, a bar-like member on said extension with an arcuate surface extending substantially parallel with said flange for engaging the opposite side of said flange, said jaw elements being movable between opened and closed positions by engagement of said bar elements with said flange, a plurality of springs reacting between said assembly and said piston, and an adjustable stop means for limiting the travel of said piston and thereby limiting the amount of opening and closing movement of said jaw elements.

2. A diaphragm chuck for lathe, grinder, screw and boring machines, comprising a cylindrical-shaped body with an end member and cylindrical side walls forming a fluid cylinder, a hub for said body connected to said end member, a piston in said cylinder forming a pressure chamber between the piston and said end member, said hub having a passage therein connecting said chamber with a source of fluid under pressure, a jaw assembly mounted on said body and secured to the edge of said side walls, said jaw assembly having a solid ring-shaped outer portion and four equally spaced jaw elements attached integrally to and extending radially inwardly from said outer portion to a point adjacent said hub, each of said jaw elements having an inwardly extending flange on the inner side thereof, a bar-like member on said piston with an arcuate surface extending substantially parallel with said flange on said piston for engaging the adjacent surface of said flange, an extension on said piston disposed adjacent to said hub extending to the opposite side of said flange, a bar-like member on said extension with an arcuate surface extending substantially parallel with said flange for engaging the opposite side of said flange, said jaw elements being movable between opened and closed positions by engagement of said bar elements with said flange, and a plurality of springs reacting between said assembly and said piston.

3. A chuck comprising a cylindrical-shaped body with an end member and cylindrical side walls forming a fluid cylinder, a hub for said body connected to said end member, a piston in said cylinder forming a pressure chamber between the piston and said end member, said hub having a passage therein connecting said chamber with a source of fluid under pressure, a jaw assembly mounted on said body and secured to the edge of said side walls, said jaw assembly having a solid ring-shaped outer portion and a plurality of equally spaced jaw elements attached integrally to and extending radially inwardly from said outer portion to a point adjacent said hub, each of said jaw elements having an inwardly extending flange on the inner side thereof, a bar-like member on said piston with an arcuate surface extending substantially parallel with said flange on said piston for engaging the adjacent surface of said flange, an extension on said piston disposed adjacent to said hub extending to the opposite side of said flange, and a bar-like member on said extension with an arcuate surface extending substantially parallel with said flange for engaging the opposite side of said flange, said jaw elements being movable between opened and closed positions by engagement of said bar elements with said flange.

4. A chuck comprising a cylindrical-shaped body with an end member and cylindrical side walls forming a fluid cylinder, a piston in said cylinder forming a pressure chamber between the piston and said end member, a jaw assembly mounted on said body and secured to the edge of said side walls, said jaw assembly having a solid ring-shaped outer portion and a plurality of equally spaced jaw elements attached integrally to and extending radially inwardly from said outer portion, each of said jaw elements having an inwardly extending flange on the inner side thereof, a bar-like member on said piston with an arcuate surface extending substantially parallel with said flange on said piston for engaging the adjacent surface of said flange, an extension on said piston disposed adjacent to said hub extending to the opposite side of said flange, a bar-like member on said extension with an arcuate surface extending substantially parallel with said flange for engaging the opposite side of said flange, said jaw elements being movable between opened and closed positions by engagement of said bar elements with said flange, and a plurality of springs reacting between said assembly and said piston.

5. A chuck comprising a body with an end member and cylindrical side walls forming a fluid cylinder, a piston in said cylinder forming a pressure chamber between the piston and said end member, a jaw assembly mounted on said body and secured to the edge of said side walls, said jaw assembly having a ring-shaped outer portion and a plurality of equally spaced jaw elements attached to and extending radially inwardly from said outer portion, each of said jaw elements having an inwardly extending flange on the inner side thereof, a bar-like member on said piston extending substantially parallel with said flange on said piston for engaging the adjacent surface of said flange, an extension on said piston extending to the opposite side of said flange, and a bar-like member on said extension extending substantially parallel with said flange for engaging the opposite side of said flange.

6. A chuck comprising a body with an end member and cylindrical side walls forming a fluid cylinder, a piston in said cylinder forming a pressure chamber between the piston and said end member, a jaw assembly mounted on said body and secured to the edge of said side walls, said jaw assembly having a ring-shaped outer portion and a plurality of equally spaced jaw elements attached to and extending radially inwardly from said outer portion, a bar-like member on said piston for engaging the adjacent surface of said jaw element, an extension on said piston, and a bar-like member on said extension for engaging an opposed surface on said jaw elements.

References Cited by the Examiner
UNITED STATES PATENTS

| 2,832,601 | 4/1958 | Mann. | |
| 2,948,541 | 8/1960 | Reich | 279—4 |
| 3,087,737 | 4/1963 | Werth | 279—4 |

LESTER M. SWINGLE, *Primary Examiner.*

ROBERT C. RIORDON, *Examiner.*

H. V. STAHLHUTH, *Assistant Examiner.*